United States Patent
Balan et al.

(10) Patent No.: US 12,167,244 B2
(45) Date of Patent: *Dec. 10, 2024

(54) GEOLOCATION-BASED POLICY RULES FOR VIEWING REDACTED CONTENT

(71) Applicant: Rocket Software Technologies, Inc., Waltham, MA (US)

(72) Inventors: Sudhi Balan, Fairfield, CT (US); Randy Baiad, Brookfield, CT (US); Robert Russell, New Canaan, CT (US)

(73) Assignee: Rocket Software Technologies, Inc., Waltham, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/496,055

(22) Filed: Oct. 27, 2023

(65) Prior Publication Data
US 2024/0056823 A1 Feb. 15, 2024

Related U.S. Application Data

(63) Continuation of application No. 17/498,436, filed on Oct. 11, 2021, now Pat. No. 11,849,330.

(60) Provisional application No. 63/091,134, filed on Oct. 13, 2020.

(51) Int. Cl.
*H04W 12/63* (2021.01)
*H04W 4/029* (2018.01)
*H04W 12/06* (2021.01)
*H04W 12/104* (2021.01)

(52) U.S. Cl.
CPC ........... *H04W 12/63* (2021.01); *H04W 4/029* (2018.02); *H04W 12/06* (2013.01); *H04W 12/104* (2021.01)

(58) Field of Classification Search
CPC ..... H04W 12/63; H04W 4/029; H04W 12/06; H04W 12/104; H04W 4/02; H04W 12/08; H04W 12/61; H04L 63/104; H04L 63/107; H04L 63/108; G06F 2221/2111; G06F 16/9537; G06F 21/604; G06F 21/6218

See application file for complete search history.

(56) References Cited

U.S. PATENT DOCUMENTS

| | | | | |
|---|---|---|---|---|
| 7,359,076 B2* | 4/2008 | Uchino | ................. | G06F 3/1238 358/1.18 |
| 10,355,864 B2* | 7/2019 | Konduru | ............... | H04L 9/3213 |
| 11,849,330 B2* | 12/2023 | Balan | .................... | H04W 12/63 |
| 2016/0173623 A1* | 6/2016 | Broussard | ............ | H04L 63/107 713/168 |
| 2020/0213319 A1* | 7/2020 | Bowie | .................. | H04L 63/108 |

* cited by examiner

*Primary Examiner* — Brandon J Miller
(74) *Attorney, Agent, or Firm* — Danielson Legal LLC

(57) ABSTRACT

A system for providing geolocation-based policy rules is provided. The system includes a policy engine and a memory communicatively coupled to the policy engine. The policy engine is configured to receive geolocation data for a plurality of objects. The policy engine is configured to create, based on the geolocation data, location policy attributes for the plurality of objects. The policy engine is configured to incorporate the location policy attributes into policy rules. The policy rules include rules for accessing the plurality of objects. The policy engine is further configured to execute the policy rules with regard to the plurality of objects.

20 Claims, 7 Drawing Sheets

| Add | Delete |

39 of 39 item definitions

| Shown |

New Item — 505

Annotations — 410
ASG.MobiusView

Book Info
ASG.Sample

Capture Domain
ASG.MobiusView

Collections Domain
ASG.MobiusView

Configuration Settings Domain
ASG.MobiusView

Content Streams Domain
ASG.MobiusView

Current Time
ASG.MobiusView

400

| Apply | Reload |

Name*

[Item Definition Name 415]

Display Name*

[Item Definition Display Name 420]

Description 425

[                    ]

Attribute 510

| Add | Delete |

Currently there are no item components
430

Collection  ◯ No

Geo Enabled ◯ No

*FIG. 4*

GEOLOCATION-BASED POLICY RULES FOR VIEWING REDACTED CONTENT

CROSS REFERENCE TO RELATED APPLICATIONS

The present application is a continuation of U.S. Utility patent application Ser. No. 17/498,436, filed Oct. 11, 2021, titled "Geolocation-Based Policy Rules," which claims priority of U.S. Provisional Patent Application No. 63/091,134, filed on Oct. 13, 2020, entitled "Geolocation-Based Policy Rules." All of the aforementioned disclosures are hereby incorporated by reference herein in their entireties for all purposes including all references cited therein.

TECHNICAL FIELD

The present disclosure relates generally to data processing and, more specifically, to systems and methods for providing geolocation-based policy rules.

BACKGROUND

Geolocations have been known for a long time. For example, some content providers, such as Netflix, can provide different content in the United States (US) and Canada based on the location of a consumer. Similarly, Amazon can show different merchandise based on a user location. Various techniques for determining user locations using their Internet browsers, mobile location services, and Wi-Fi triangulation have also been known for a long time. Thus, finding where users live or finding where users are accessing the Internet from is a solution that has existed for a long time. However, existing solution for providing access based on the location of the user do not utilize location attributes to create complex business rules for enterprise governance and management solutions.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present disclosure are directed to systems and methods for providing geolocation-based policy rules. According to an example embodiment, a system for providing geolocation-based policy rules is provided. The system may include a policy engine and a memory communicatively coupled to the policy engine. The policy engine may be configured to receive geolocation data for a plurality of objects. The policy engine may be further configured to create, based on the geolocation data, location policy attributes for the plurality of objects. The policy engine may be configured to incorporate the location policy attributes into policy rules. The policy rules may include rules for accessing the plurality of objects. The policy engine may be further configured to execute the policy rules with regard to the plurality of objects. The memory may be configured to store the policy rules.

According to another example embodiment, a method for providing geolocation-based policy rules is provided. The method may commence with receiving, by a policy engine, geolocation data for a plurality of objects. The method may include creating, by the policy engine and based on the geolocation data, location policy attributes for the plurality of objects. The method may further include incorporating, by the policy engine, the location policy attributes into policy rules. The policy rules may include rules for accessing the plurality of objects. The method may continue with executing, by the policy engine, the policy rules with regard to the plurality of objects.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

FIG. 4 is a screenshot showing creation of a policy rule and incorporating a location policy attribute to the policy rule, according to an example embodiment.

DETAILED DESCRIPTION

Figure 1:
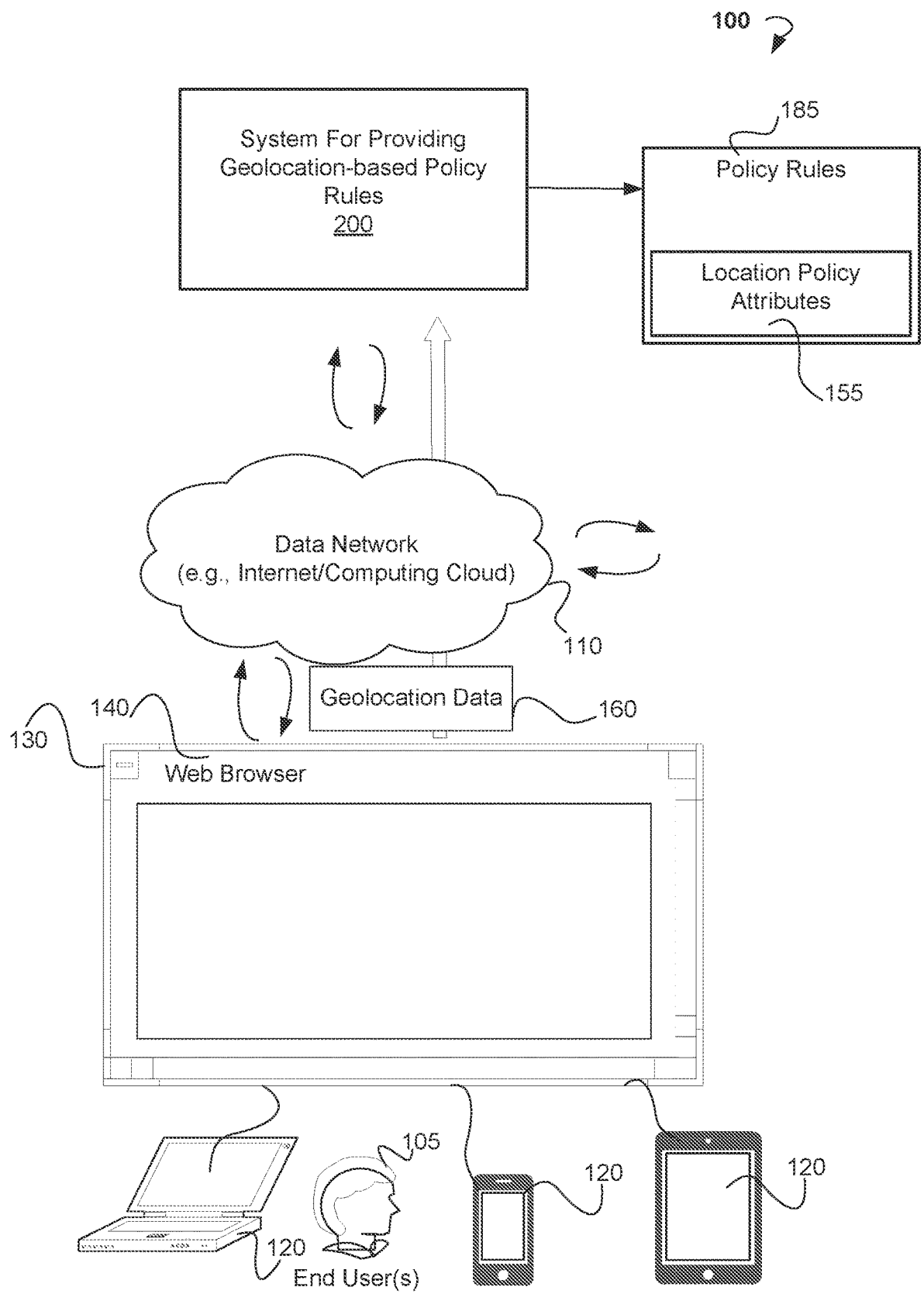
FIG. 1 illustrates an environment within which systems and methods for providing geolocation-based policy rules can be implemented, according to an example embodiment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In general, the present disclosure relates to systems and methods for providing geolocation-based policy rules. The systems and methods enhance the utility of dynamic policy rules by allowing attachment of geolocation to objects and enabling the location-sensitive policy rules. The systems and methods can enable policy rules based on location. A designer of the policy rules can use geolocation attributes to write business rules. A geolocation can be attached as a property to any number of domain objects and policies. For example, geolocations can be attached to content, users, and printers. The content, users, and printers are domain objects in the policies for which the rules can be written. Thus, the system allows any object to have locations as fields, thereby giving the system the ability to write rules on the combination of various attributes, including locations. For example, rules can be written to allow a user to view redacted content only based on access privileges and the location of the user. In another example, a policy rule can allow changes to annotations only when a user is in a company office. Designers of the policy rules can associate location properties with domain objects. These location properties can be populated using standard mechanisms such as a location supported by web browsers, mobile location services, triangulation techniques, or based on user specified data.

The location is important because many other parameters like user behavior can be driven by the locations. For example, according to the European law for General Data Protection Regulation (GDPR), if the user is in the European Union, data needs be created in a particular way for that user. Likewise, if the content is in the European Union, the content needs to be created in a particular way. Therefore, the location is an attribute that allows writing rules that map into the location and expand capabilities for providing access to the content to which the policy is applicable. The system of the present disclosure provides a geolocation-based rule driving automation.

In an example embodiment, without knowing the location, rules may not allow a user to access a document at 1 a.m. because the user is not supposed be in the office at that time. With geolocation-based rules, the system can determine that the person trying to access the document is in the United States (US) and the document is in the United Kingdom (UK), therefore, while it is 1:00 a.m. in the United Kingdom (UK) it is still 5:00 p.m. in the United States (US), which is within normal working hours.

Building business rules with geolocation-based policy attributes can allow dramatically expanding the number of use cases. In an example embodiment, printers are objects associated with locations, so if the printer is in the New York office, users in the Barcelona office can be disabled from printing to that printer. In another example, if a client is not in his office, the system may not allow the client to access sensitive data. Such rules may not be possible to implement without using locations as attributes. Locations can be determined, for example, using computer browsers, mobile phone location services, global positioning system (GPS) data, Wi-Fi location data, and cell identification (ID) data. Alternatively, locations can be supplied as attributes by third parties or users.

If an application makes an application programming interface (API) call for a list of printers, the API call can be intercepted in order to decide what printer to display, if at all. Among other things, the decision can be based on the location of the user utilizing the application, access privileges of the user, and locations of the printers. The policy can allow writing complex rules based on geolocations.

A method for providing geolocation-based policy rules can commence with receiving geolocation data for a plurality of objects. Based on the geolocation data, location policy attributes can be created for the plurality of objects. The location policy attributes can be incorporated into policy rules. The policy rules may include rules for accessing the plurality of objects. Therefore, the location can be added to the policy rule as a location policy attribute and evaluated as part of the conditions for triggering the policy rule. A policy can then use the location attribute in the policy rule. The policy rules may be executed with regard to the plurality of objects. For example, the policy can be used to ensure that updates to a document, content, or system are only permitted when a user that performs the updates is located in the company office.

The location can be associated with an object or a person. Based on the location and other attributes associated with the person, a policy engine can decide which actions the person can perform and what content or portions of content the person is allowed to see. For example, for documents, a piece of content in the repository can be based on a particular location, so what the person can see or do may depend on the location of the person. If the person is at home and not working from home, specific actions the person cannot take can be set in the policy rules. Checks can be annotated with specific information to be validated, which includes location attributes. In another example, a contact can be validated only if the contact is in the company office.

The method of the present disclosure may also include defining policy rules. For example, the policy rule may allow a person to see and have access to a list of printers based on the distance of the person to a particular office. Rules can be created based on whether the user is in or out of the office. In another example embodiment, if someone is trying to access a particular piece of content, the policy engine can determine that this is the person that has a permission to access the content. The policy engine may then determine that the same person tries accessing two pieces of content from two different locations, farther apart that it takes to go from one location to the other using a plane, for instance, from France, and two hours later, from Jakarta. Such activities can be deemed suspicious.

Referring now to the drawings, FIG. 1 illustrates an environment 100 within which systems and methods for providing geolocation-based policy rules can be implemented. The environment 100 may include a data network 110 (e.g., an Internet or a computing cloud), end user(s) 105, client device(s) 120 (also referred to herein as user devices) associated with the end user(s) 105 (also referred to herein as users), and a system 200 for providing geolocation-based policy rules. Client device(s) 120 may include a personal computer (PC), a desktop computer, a laptop, a smartphone, a tablet, or so forth.

The client device 120 may have a user interface 130. Furthermore, a web browser 140 may be running on the client device 120 and displayed using the user interface 130. The web browser 140 may communicate with the system 200 via the data network 110.

The data network 110 may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

The system 200 can receive geolocation data 160 for a plurality of objects. The plurality of objects may include data objects, persons, such as end user(s) 105, and hardware, such as applications running on the client devices 120. Based on the geolocation data 160, the system 200 may create location policy attributes 155 for the plurality of objects and incorporate the location policy attributes 155 into policy rules 185. The policy rules 185 may comprise including rules for accessing the plurality of objects. The policy rules 185 with the location policy attributes 155 can be executed by the system 200 in respect of the plurality of objects.

Figure 2:
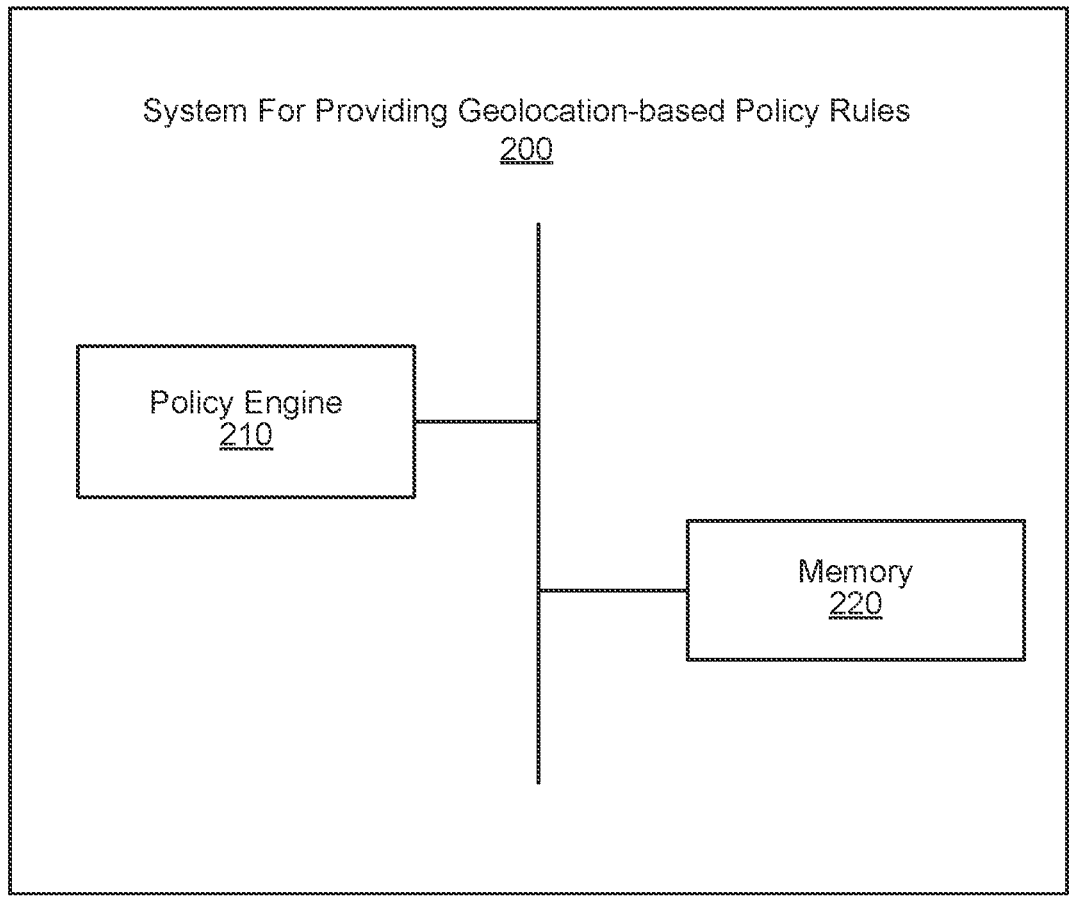
FIG. 2 shows a block diagram of a system for providing geolocation-based policy rules, according to an example embodiment.
Figure 7:
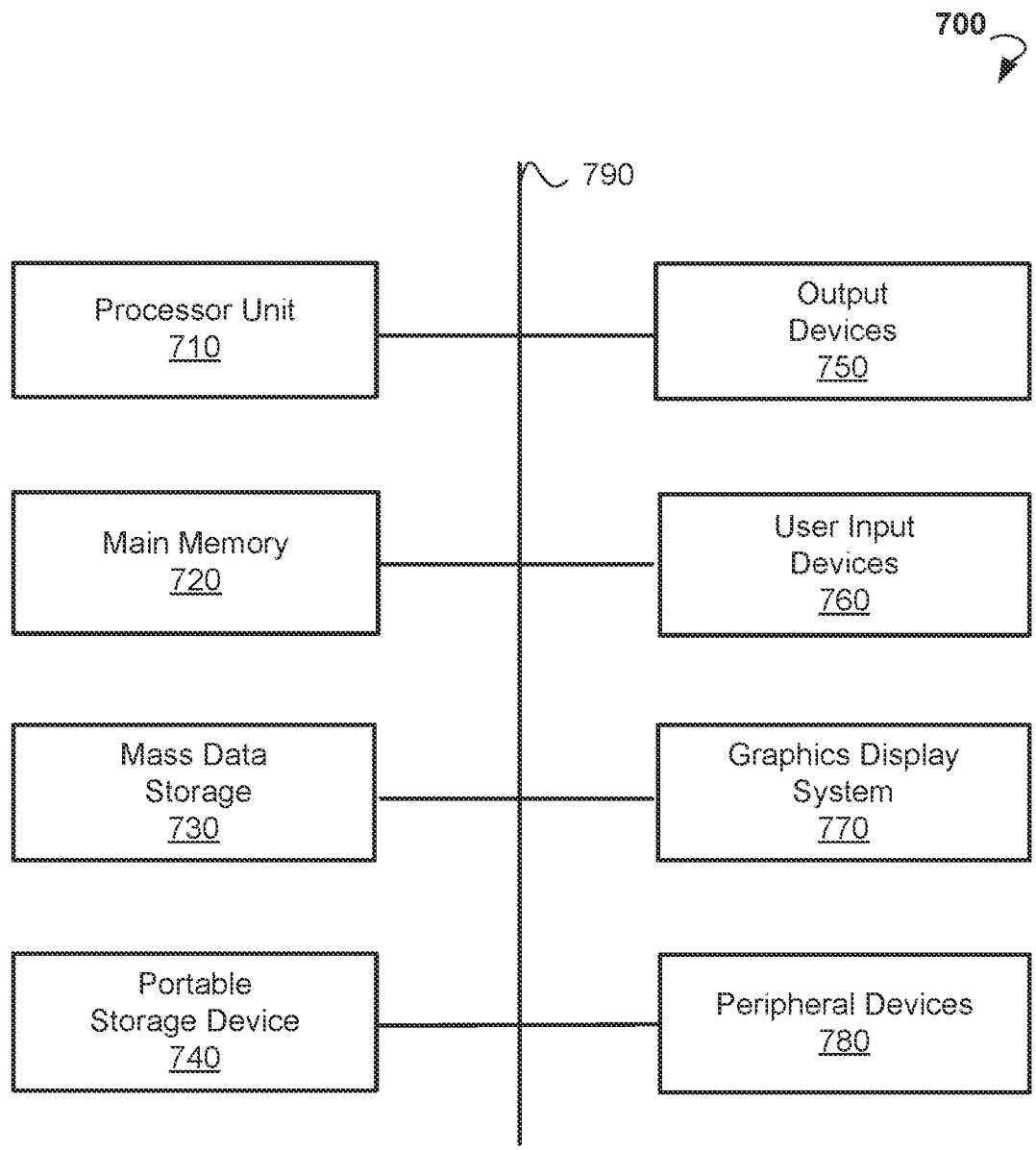
FIG. 7 shows a computing system suitable for implementing embodiments of the present disclosure.

FIG. 2 is a block diagram illustrating a system 200 for providing geolocation-based policy rules, according to an example embodiment. The system 200 may include a policy engine 210 and a memory 220 communicatively coupled to the policy engine 210 and configured to store policy rules. In an example embodiment, the operations performed by the policy engine 210 may be performed by a processor. The memory 220 may store instructions executable by the processor. Example processors are shown in FIG. 7 as one or more processor units 710. The operations performed the policy engine 210 of the system 200 are described in more detail below with reference to FIG. 3.

Figure 3:
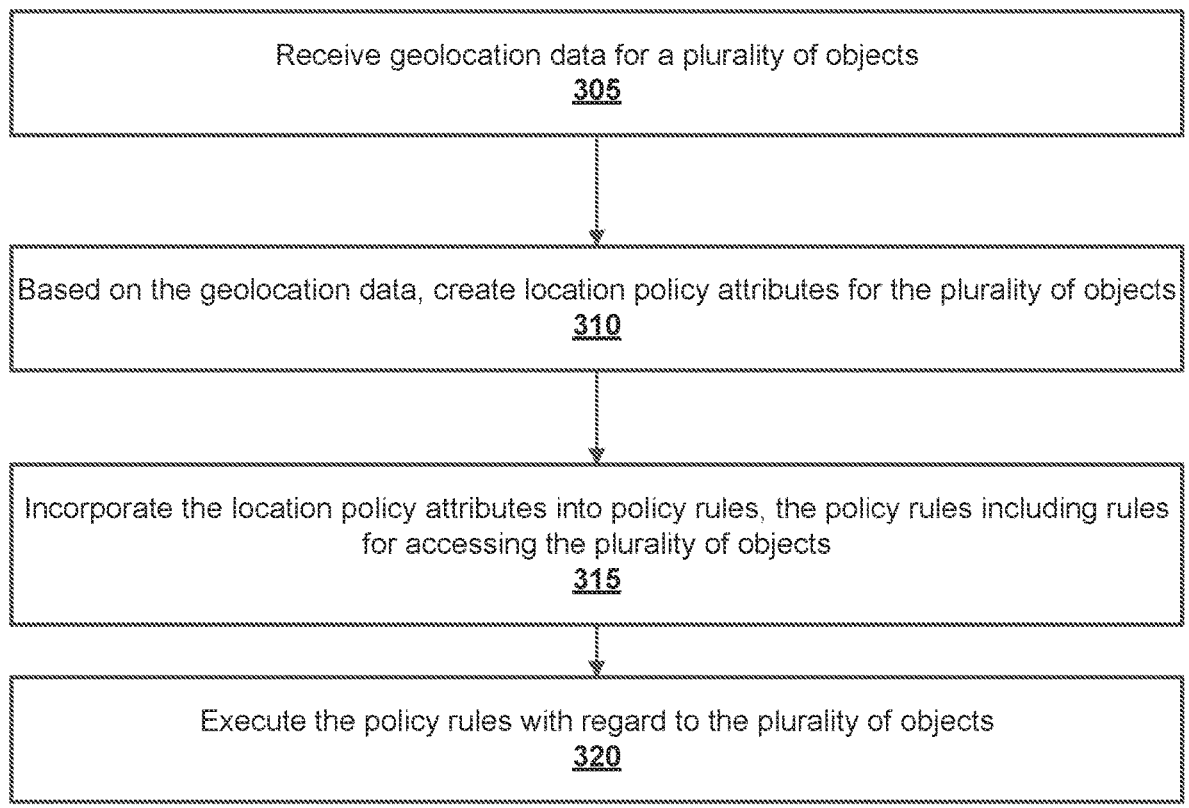
FIG. 3 shows a process flow diagram of a method for providing geolocation-based policy rules, according to an example embodiment.

FIG. 3 shows a process flow diagram of a method 300 for providing geolocation-based policy rules, according to an example embodiment. In some embodiments, the operations may be combined, performed in parallel, or performed in a different order. The method 300 may also include additional or fewer operations than those illustrated. The method 300 may be performed by processing logic that may comprise hardware (e.g., decision making logic, dedicated logic, programmable logic, and microcode), software (such as software run on a general-purpose computer system or a dedicated machine), or a combination of both.

The method 300 may commence with receiving, by a policy engine, geolocation data for a plurality of objects at operation 305. The plurality of objects may include a data object, content, a file, a person, a user, a hardware, a software, a domain, a domain object, a network resource, a network device, and so forth. The geolocation data may be determined based on information received from web browsers, mobile location services, cell tower triangulation, user data, third party data, GPS data, Wi-Fi location data, cell IDs, and so forth. In an example embodiment, the geolocation data may be determined based on network data associated with the plurality of objects. In a further example embodiment, the geolocation data may be received from a third party.

Upon receiving the geolocation data, the location policy attributes may be created by the policy engine for the plurality of objects based on the geolocation data, at operation 310. The method 300 may further include incorporating, by the policy engine, the location policy attributes into policy rules at operation 315. The policy rules may include rules for accessing the plurality of objects.

In an example embodiment, the method 300 may further include determining further attributes associated with the plurality of objects. The further attributes may include security of access, content metadata, an identity of a user, an access privilege of the user, a role of the user, an applicable law, a geographic region, a time zone, and so forth. The method 300 may further include incorporating the further attributes into the policy rules. The selective providing the user with the access may be further based on the further attributes.

The method 300 may further include executing, by the policy engine, the policy rules with regard to the plurality of objects at operation 320. In an example embodiment, the execution of the policy rules may include allowing or denying one or more of the following actions with regard to the plurality of objects such as annotations, updates, access modifications, view modifications, content modifications, contact information filtering, and so forth.

In an example embodiment, the execution of the policy rules may be performed as follows. An API call to access one of the plurality of objects may be received from a user device associated with a user. Upon receiving the API call, a location policy attribute may be determined. The location policy attribute may be associated with the user device initiating the API call, the user associated with the user device, an application running on the user device and initiating the API call, and so forth. Based on the policy rules and the location policy attribute, it may be determined whether the access to the one of the plurality of objects is allowed. Based on the determination, the user may be selectively provided with the access to the one of the plurality of objects.

In an example embodiment, the execution of the policy rules may be performed as follows. A request to access one of the plurality of objects may be received from a user device associated with a user. Based on the request, a location policy attribute associated with the user may be determined. Based on the policy rules and the location policy attribute, it may be determined whether the access to the one of the plurality of objects is allowed for the user. Based on the determination of whether the access is allowed, the user may be selectively provided with the access to the one of the plurality of objects. Specifically, if it is determined that the access to the one of the plurality of objects is allowed for the user, the user is provided with the access to the one of the plurality of objects. If it is determined that the access to the one of the plurality of objects is not allowed for the user, the access to the one of the plurality of objects is denied to the user.

In a further example embodiment, the execution of the policy rules may be performed as follows. A request to perform an action with respect to a first object of the plurality of objects may be received from a user device associated with a user. Upon receiving the request, a location policy attribute associated with the user may be determined. Based on the location policy attribute, one or more second objects of the plurality of objects may be determined. The one or more second objects may be configured to perform the action with respect to the first object. A list of the one or more second objects may be provided to the user to allow the user to select one of the one or more second objects to perform the action.

For example, a company may have several offices in different countries. The offices may be connected to create a network. Users of the company may have access to the network. In an example embodiment, printers located in all offices may be objects associated with locations. A user currently located in the Barcelona office may request to print a document. In response, the system of the present disclosure may determine, based on data associated with a user device of the user, that the user is in the Barcelona office. Based on this location policy attribute, printers that are located in the Barcelona office may be determined. A list of the printers located in the Barcelona office may be provided to the user to allow the user to select one of the printers located in the Barcelona office to print the document. Therefore, if the printer is in the New York office, users in the Barcelona office can be disabled from printing to the printer in the New York office.

FIG. 4 is a screenshot 400 showing creating a policy rule 505 and incorporating location policy attributes to the policy rule 505, according to an example embodiment. The screenshot 400 shows adding the policy rule 505 that allows changes to annotations only when a particular user is in a company office. A policy designer can associate a location policy attribute 510 with domain objects 410. The location policy attribute 510 can be populated using standard mechanisms, such as a user location supported by web browsers of a user device or by user specified data. The policy designer can start with defining a location as the location policy attribute 510 for annotation requests. The policy designer can provide information related to the location policy attribute 510, such as a name 415 of the location policy attribute 510, a display name 420, description 425, and so forth. When the policy designer is ready to fill in the information related to the policy rule 505, the policy designer can press an add button 430.

Figure 5:
FIG. 5 is a screenshot showing adding location to a policy rule for evaluation of the location as part of conditions for triggering the policy rule, according to an example embodiment.

FIG. 5 is a screenshot 500 showing adding the location as the location policy attribute 510 to the policy rule 505 for evaluating the location as part of the conditions for triggering the policy rule 505. To add the location to the policy rule 505, the policy designer may provide rule details 515. The rule details 515 may include a target point 520 (i.e., one of a plurality of objects such as an office, a device, and so forth), a distance 525 from the target point, metadata 530, and so forth.

Figure 6:
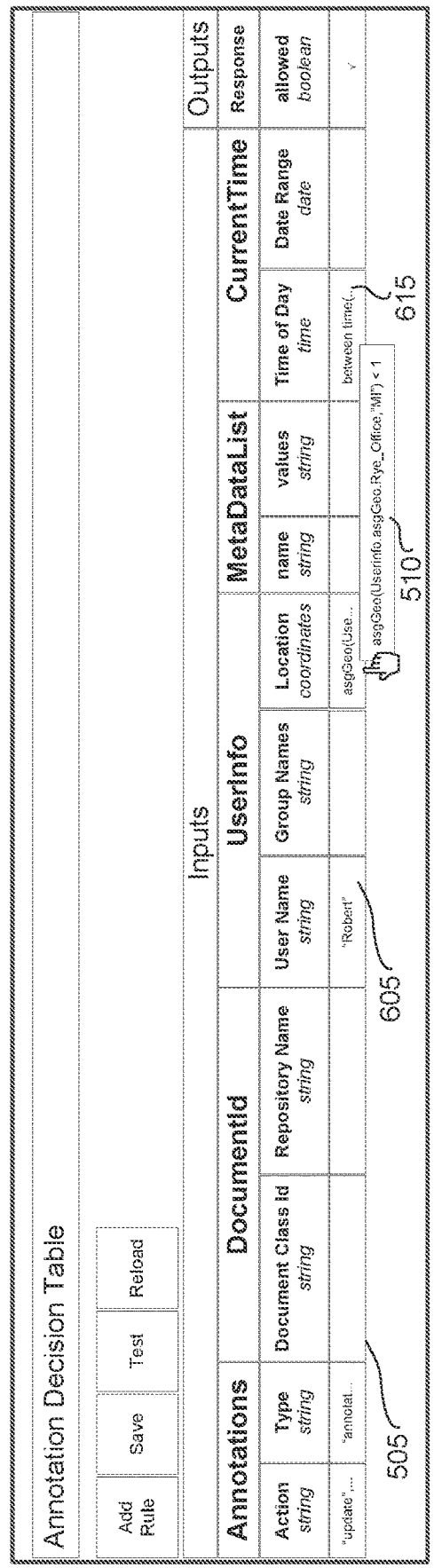
FIG. 6 is a screenshot showing use of a location policy attribute in a policy rule, according to an example embodiment.

FIG. 6 is a screenshot 600 showing using the location policy attribute 510 in the policy rule 505, according to an example embodiment. The policy rule 505, which relates to allowing changes to annotations only when the user is in a company office, now uses the location policy attribute 510 to ensure that updates to the annotations are only permitted for users that are located in the office. Specifically, the policy rule 505 ensures that the user having a user name 605 "Robert" has a permit to perform annotations in the document only when the location (determined based on the location policy attribute 510) of the user device used by the user named "Robert" is the same as the location of the office. Moreover, the policy rule 505 may permit the user having the user name 605 "Robert" to perform annotations only during the work hours, as set in a time block 615 of the policy rule 505.

FIG. 7 illustrates an exemplary computer system 700 that may be used to implement some embodiments of the present disclosure. The computer system 700 of FIG. 7 may be implemented in the contexts of the system 200 shown in FIG. 2. The computer system 700 of FIG. 7 includes one or more processor units 710 and a main memory 720. The main memory 720 stores, in part, instructions and data for execution by the processor units 710. The main memory 720 stores the executable code when in operation, in this example. The computer system 700 of FIG. 7 further includes a mass data storage 730, a portable storage device 740, output devices 750, user input devices 760, a graphics display system 770, and peripheral devices 780.

The components shown in FIG. 7 are depicted as being connected via a single bus 790. The components may be connected through one or more data transport means. The processor unit 710 and the main memory 720 are connected via a local microprocessor bus, and the mass data storage 730, the peripheral device(s) 780, the portable storage device 740, and the graphics display system 770 are connected via one or more input/output (I/O) buses.

The mass data storage 730, which can be implemented with a magnetic disk drive, solid state drive, or an optical disk drive, is a non-volatile storage device for storing data and instructions for use by the processor unit 710. The mass data storage 730 stores the system software for implementing embodiments of the present disclosure for purposes of loading that software into the main memory 720.

The portable storage device 740 operates in conjunction with a portable non-volatile storage medium, such as a flash drive, floppy disk, compact disk, digital video disc, or Universal Serial Bus storage device, to input and output data and code to and from the computer system 700 of FIG. 7. The system software for implementing embodiments of the present disclosure is stored on such a portable medium and input to the computer system 700 via the portable storage device 740.

The user input devices 760 can provide a portion of a user interface. The user input devices 760 may include one or more microphones; an alphanumeric keypad, such as a keyboard, for inputting alphanumeric and other information; or a pointing device, such as a mouse, a trackball, stylus, or cursor direction keys. The user input devices 760 can also include a touchscreen. Additionally, the computer system 700 as shown in FIG. 7 includes the output devices 750. Suitable output devices 750 include speakers, printers, network interfaces, and monitors.

The graphics display system 770 can include a liquid crystal display or other suitable display device. The graphics display system 770 is configurable to receive textual and graphical information and process the information for output to the display device.

The peripheral devices 780 may include any type of computer support device to add additional functionality to the computer system.

The components provided in the computer system 700 of FIG. 7 are those typically found in computer systems that may be suitable for use with embodiments of the present disclosure and are intended to represent a broad category of such computer components that are well known in the art. Thus, the computer system 700 of FIG. 7 can be a personal computer, a handheld computer system, a telephone, a mobile phone, a smartphone, a laptop computer, a mobile computer system, a workstation, a tablet, a phablet, a server, a minicomputer, a mainframe computer, a wearable device, or any other computer system. The computer system 700 may also include different bus configurations, networked platforms, multi-processor platforms, and the like. Various operating systems may be used including UNIX®, LINUX®, WINDOWS®, MAC OS®, PALM OS®, QNX®, ANDROID®, IOS®, CHROME®, TIZEN®, and other suitable operating systems.

The processing for various embodiments may be implemented in software that is cloud-based. In some embodiments, the computer system 700 is implemented as a cloud-based computing environment, such as a virtual machine operating within a computing cloud. In other embodiments, the computer system 700 may itself include a cloud-based computing environment, where the functionalities of the computer system 700 are executed in a distributed fashion. Thus, the computer system 700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 700, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, various embodiments of systems and methods for providing geolocation-based policy rules have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense. There are many alternative ways of implementing the present technology. The disclosed examples are illustrative and not restrictive.

What is claimed is:

1. A system for providing geolocation-based policy rules, the system comprising:
   a policy engine;
   a memory communicatively coupled to the policy engine having instructions stored thereon; and
   one or more processors to execute the instructions and cause the policy engine to:
   receive geolocation data for a plurality of objects;
   based on the geolocation data, create location policy attributes for the plurality of objects;
   incorporate the location policy attributes into policy rules, the policy rules including rules for accessing the plurality of objects; and
   execute the policy rules with regard to the plurality of objects, the policy rules comprising allowing a user to view redacted content based on access privileges and the geolocation data of the user.

2. The system of claim 1, wherein the execution of the policy rules comprises:
   receiving, from a user, a request to access one of the plurality of objects;
   determining a location policy attribute associated with the user;
   determining, based on the policy rules and the location policy attribute, whether the access to the one of the plurality of objects is allowed for the user; and
   based on the determination, selectively providing the user with the access to the one of the plurality of objects.

3. The system of claim 2, wherein the one or more processors to execute the instructions and further cause the policy engine to:
   determining further attributes associated with the plurality of objects, the further attributes including one or more of the following: security of access, content metadata, an identity of a user, an access privilege of the user, a role of the user, an applicable law, a geographic region, and a time zone, wherein the selectively providing the user with the access is further based on the further attributes.

4. The system of claim 1, wherein the execution of the policy rules includes:
   receiving an Application Programming Interface (API) call to access one of the plurality of objects;
   determining a location policy attribute associated with at least one of the following: a user device initiating the API call, a user associated with the user device, and an application running on the user device and initiating the API call;
   determining, based on the policy rules and the location policy attribute, whether the access to the one of the plurality of objects is allowed; and
   based on the determining, selectively providing the user with the access to the one of the plurality of objects.

5. The system of claim 1, wherein the plurality of objects includes one or more of the following: a data object, content, a file, a person, a user, a hardware, a software, a domain, a domain object, a network resource, and a network device.

6. The system of claim 1, wherein the geolocation data is determined based on one or more of the following: information received from web browsers, mobile location services, cell tower triangulation, user data, third party data, global positioning system (GPS) data, Wi-Fi location data, and cell identification data (ID).

7. The system of claim 1, wherein the execution of the policy rules includes allowing or denying one or more of the following: annotations, updates, access modifications, view modifications, content modifications, and contact information filtering.

8. The system of claim 1, wherein the geolocation data are determined based on network data associated with the plurality of objects or received from a third party.

9. The system of claim 1, wherein the execution of the policy rules includes:
   receiving, from a user, a request to perform an action with respect to a first object of the plurality of objects;

determining a location policy attribute associated with the user;

based on the location policy attribute, determining one or more second objects configured to perform the action with respect to the first object; and providing a list of the one or more second objects to the user to allow the user to select one of the one or more second objects to perform the action.

10. A method for providing geolocation-based policy rules, the method comprising:

receiving, by a policy engine, geolocation data for a plurality of objects;

based on the geolocation data, creating, by the policy engine, location policy attributes for the plurality of objects;

incorporating, by the policy engine, the location policy attributes into policy rules, the policy rules including rules for accessing the plurality of objects; and executing, by the policy engine, the policy rules with regard to the plurality of objects, the policy rules comprising allowing a user to view redacted content based on access privileges and the geolocation data of the user.

11. The method of claim 10, wherein the execution of the policy rules includes:

receiving, from a user, a request to access one of the plurality of objects;

determining a location policy attribute associated with the user;

determining, based on the policy rules and the location policy attribute, whether the access to the one of the plurality of objects is allowed for the user; and based on the determination, selectively providing the user with the access to the one of the plurality of objects.

12. The method of claim 11, further comprising:

determining further attributes associated with the plurality of objects, the further attributes including one or more of the following: security of access, content metadata, an identity of a user, an access privilege of the user, a role of the user, an applicable law, a geographic region, and a time zone, wherein the selectively providing the user with the access is further based on the further attributes.

13. The method of claim 12, further comprising incorporating the further attributes into the policy rules.

14. The method of claim 10, wherein the execution of the policy rules includes:

receiving an Application Programming Interface (API) call to access one of the plurality of objects;

determining a location policy attribute associated with at least one of the following: a user device initiating the API call, a user associated with the user device, and an application running on the user device and initiating the API call;

determining, based on the policy rules and the location policy attribute, whether the access to the one of the plurality of objects is allowed; and based on the determining, selectively providing the user with the access to the one of the plurality of objects.

15. The method of claim 10, wherein the plurality of objects includes one or more of the following: a data object, content, a file, a person, a user, a hardware, a software, a domain, a domain object, a network resource, and a network device.

16. The method of claim 10, wherein the geolocation data is determined based on one or more of the following: information received from web browsers, mobile location services, cell tower triangulation, user data, third party data, global positioning system (GPS) data, Wi-Fi location data, and cell identification data (ID).

17. The method of claim 10, wherein the execution of the policy rules includes allowing or denying one or more of the following: annotations, updates, access modifications, view modifications, content modifications, and contact information filtering.

18. The method of claim 10, wherein the geolocation data are received from a third party or determined based on network data associated with the plurality of objects.

19. The method of claim 10, wherein the execution of the policy rules includes:

receiving, from a user, a request to perform an action with respect to a first object of the plurality of objects;

determining a location policy attribute associated with the user;

based on the location policy attribute, determining one or more second objects configured to perform the action with respect to the first object; and providing a list of the one or more second objects to the user to allow the user to select one of the one or more second objects to perform the action.

20. A non-transitory computer-readable storage medium having embodied thereon instructions, which when executed by at least one processor, perform steps of a method comprising:

processing, by a policy engine on at least one computing system, received geolocation data for a plurality of objects;

based on the geolocation data, creating, by the policy engine, location policy attributes for the plurality of objects;

incorporating, by the policy engine, the location policy attributes into policy rules, the policy rules including rules for accessing the plurality of objects; and executing, by the policy engine, the policy rules with regard to the plurality of objects, the policy rules comprising allowing a user to view redacted content based on access privileges and the geolocation data of the user.

* * * * *